United States Patent Office 2,806,460
Patented Sept. 17, 1957

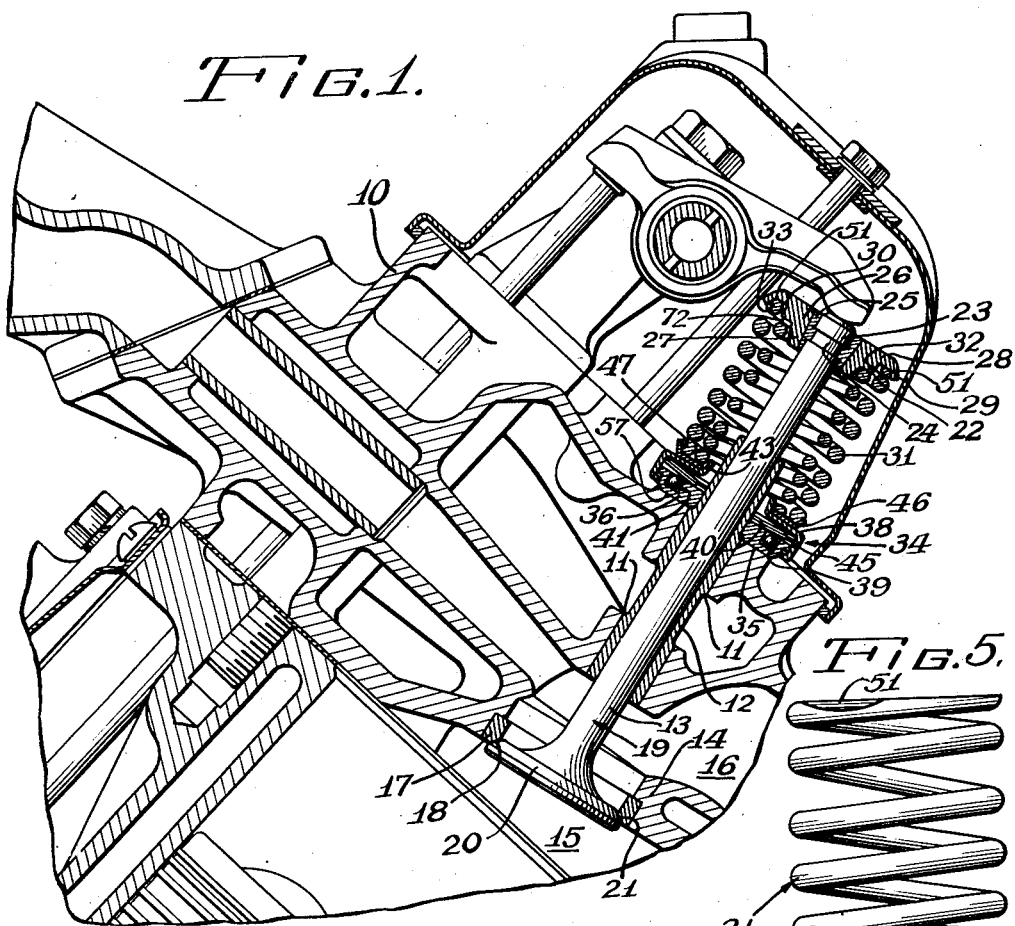

2,806,460

INTERNAL COMBUSTION ENGINE VALVE ASSEMBLY

Gale R. Beardsley, Fort Wayne, Ind., assignor to International Harvester Company, a corporation of New Jersey Application May 25, 1955, Serial No. 511,002

11 Claims. (Cl. 123—90)

This invention relates to internal combustion engine poppet valve assemblies utilizing devices for simultaneously rotating the valves upon reciprocation thereof, and more particularly to novel means for connecting certain components of a spring-loaded poppet valve assembly equipped with a valve rotating device to insure a positive application of torque tending to rotate the valve each time the valve is reciprocated.

The present invention has particular utility and advantages when employed in conjunction with valve rotating devices of the type described in U. S. Patent 2,397,502 to Ralston. Briefly stated, the valve rotating device includes a pair of disk-like members operatively connected to each other and adapted to rotate with respect to each other about a particular axis upon the application of a predetermined force urging the members axially toward each other as when the valve spring biasing the valve to its closed position is compressed during reciprocating of the valve to its opened position. Generally one of the members is connected to the valve stem and the other member is operably connected to an immovable part of the engine and thus the valve rotates relatively to the engine during reciprocation of the valve.

In overhead valve installations employing devices of the type described in the above noted patent the valve stem extends through the device and one member of the device frictionally engages a seat formed on the cylinder head. One end of the valve spring abuts the other element of the device and the opposite end of the spring frictionally engages a spring retainer secured to the end of the valve stem. The valve spring performs a dual function of biasing the valve to its closed position as in conventional engines and of interconnecting the relatively rotatable member of the valve rotating device to the spring retainer fixed to the valve stem. Thus the spring acts as a transferring medium for imparting rotary motion from the movable member to the spring retainer to rotate the valve. In all such installations prior to the present invention the rotary member of the valve rotating device and the spring retainer merely frictionally engaged respective opposite ends of the valve spring. In other words, the ability of the connections between the spring ends and the rotary member of the valve rotating device and the spring retainer to transmit torque without slipping was due entirely to the frictional resistance forces existing between the mating surfaces. Thus, while the force normal to the contacting surfaces exerted by the valve spring and the coefficient of static friction existing between the contacting surfaces in certain instances would be sufficient to prevent sliding between the contacting surfaces whereby the rotary motion from the movable member to the spring retainer is transmitted efficiently, in many other instances because of the accumulation of engine lubricating oil between the engaging surfaces and for other reasons the contacting surfaces slide with respect to each other. Consequently, in prior valve assemblies employing valve rotating devices of the character referred to above, there was no assurance that the valves actually rotated as contemplated during each reciprocation cycle thereof. It is, therefore, the primary objective of the present invention to provide a simple and inexpensive means for insuring the positive rotation of the valve regardless of the condition of the engaging surfaces of the spring ends and of the movable member and the spring retainer.

Another object is to provide a positive rotary drive connection between one element of a valve rotating device and the valve spring whereby rotary motion of the element is transmitted directly and positively, without any lost motion, to the valve spring.

A further object is the provision of a novelly constructed spring retainer adapted to cooperate with one end of the valve spring whereby the spring and retainer are coupled for positive rotation together.

The above objects are accomplished without departing radically from present-day conventional valve assembly constructions except for minor inexpensive modifications of the valve spring ends, valve retainer and one element of a valve rotating device. Hence, conventional valve assembly parts may be inexpensively modified and the objects noted above obtained with very little, if any, additional expense over the conventional valve assemblies.

The foregoing and other important objects and desirable features inherent in and encompassed by the invention together with many of the purposes and uses thereof will become readily apparent from a reading of the ensuing description in conjunction with the annexed drawings in which:

Figure 1 is a vertical cross-sectional view of an internal combustion engine poppet valve assembly embodying the invention;

Figure 2 is a plan view of one component of the invention;

Figure 3 is a cross-sectional view taken substantially along line 3—3 of Figure 2;

Figure 4 is a cross-sectional view taken substantially along line 4—4 of Figure 2;

Figure 5 is a side elevational view of the valve spring;

Figure 6 is a bottom view of the valve spring shown in Figure 5; and

Figure 7 is a cross-sectional view taken substantially along line 7—7 of Figure 6.

Referring to the drawings in detail, wherein like reference characters designate like elements throughout the various views, a cylinder head 10 is partially shown, the cylinder head 10 as in conventional overhead valve engines is provided with bores 11 adapted to receive the bushing or valve stem guide 12 which supports the valve stem 13 for reciprocatory and rotary movement. The bottom wall 14 of the cylinder head 10 defines one wall of a combustion chamber 15, partially shown, and is provided with circular valve opening for establishing gas communication between the combustion chamber 15 and a port 16, such as an exhaust port. A valve insert ring 17 is secured to the wall 14 encircling the valve opening and is provided with a beveled seating face 18 which faces the combustion chamber 15. The valve 19 includes a valve head 20 having a beveled seating face 21 adapted to co-act with the seat or face 18 of the insert ring 17 to close the exhaust opening in the wall 14. A suitable valve actuating mechanism, partially shown, is employed which is operatively connected to the upper end of the valve stem 13, as viewed in Figure 1, for sliding the valve 19 along the longitudinal axis of the valve stem 13 causing the valve head 20 to move into the combustion chamber 15 thereby establishing gas communication between the combustion chamber 15 and the valve port 16.

The free or uppermost end 23 of the valve stem 13 is provided with a conventional annular spring retainer seat member groove 24 which is adapted to receive the beads of a plurality of valve spring retainer seat members 25. The seat members 25 when assembled on the valve stem 23, as shown in Figure 1, provide a frusto-conical seating surface. A valve spring retainer 26 has a central tapered collar portion 27 which engages the frusto-conical seating surface formed by the seat members 25 and co-acts therewith to secure the spring retainer 26 on the valve stem 13. It is to be understood that when the valve 19 is assembled on the cylinder head 10, as shown in Figure 1, the spring retainer 26 is non-rotatably secured to the valve stem 13. An annular radial flange 28 extends from the tapered collar portion 27 and has its outer marginal edge 29 turned downwardly, as viewed in Figure 1. An annular shoulder 22, integrally formed with the collar portion 27 is provided which is spaced radially inwardly of the marginal edge 29 to form a spring end-receiving groove 30 which is radially spaced from the valve stem 13. The surface defining the groove 30 serves as a seating surface for one end of a spring as will be pointed out presently. The valve 19 is normally biased upwardly whereby the seating face 21 engages the valve insert ring seating face 18 by means of a relatively heavy coil spring 31 which has its upper end coil disposed within the groove 30 of the spring retainer 26 and abutting the seating surface of the spring retainer. A lighter valve spring is nested in the heavy spring 31 and has its uppermost coil biased against the annular shoulder 22. The upper end coil of the spring 31 abuts the surface 32 of the radial flange 28 and the surface 33 of the edge 29 partially defining the groove 30.

A valve rotating device 34 is interposed between the lower ends of the heavy coil spring 31 and the light coil spring and the wall surface 35 of the cylinder head 10 encircling the valve stem guide 12. The valve rotating device 34 includes a retainer cap 36, the bottom surface 37 of which is biased into engagement with the wall surface 35. The valve rotating device 34 further includes a collar 38, a plurality of balls 39 and spring washers 40. The balls 39 are carried in inclined arcuate grooves 41 in the retainer cap 36 and the spring washers 40 engaging the collar 38 and the retainer cap 36 are arranged to deflect under increased spring loads as when the valve is opened to transfer the spring load from the collar 38 to the retainer cap 36 by way of the balls 39 instead of circumventing the balls. The transfer of the increased load to the balls 39 causes the balls to roll to the bottom of the inclined grooves 41 and thereby the collar 38, which is then supported on the balls, rotates with respect to the retainer cap 36.

A dish-shaped element, designated generally by numeral 42, is provided with a central opening through which a collar 43 of the relatively rotatable part 38 extends. The dish-shaped element 42 includes a relatively flat section 44 which abuts and is suitably secured, as by welding, to an annular housing portion 45 of the element 38 extending radially from the collar 43. A skirt 46 integrally formed with the flat section 44 of the element 42 extends normally with respect to the circular flat section 44. The inner wall surface 47 and the upwardly facing surface 48 of the circular flat section 44, as viewed in Figure 1, form a seat against which the lowermost coil of the heavy valve spring 31 abuts. The lowermost coil of the lighter valve spring also engages the face of the flat section 44.

In prior valve assemblies of the type to which this invention relates upon actuation of the valve 19 to its open position wherein the valve head moves downwardly away from the insert ring 17, as viewed in Figure 1, the collar 38 of the valve rotating device 34 would rotate with respect to the retainer cap 36 because of the increased axial spring load placed on the collar 38 urging it toward the retainer cap 36. Thus, in order to rotate the valve 19 the rotary motion of the collar 38 had to be transmitted from the collar 38 to the spring retainer 26 by way of the valve spring means extending between the retainer 26 and the collar 38. The ability of the valve spring 31 which acts as a transferring medium for imparting rotary motion from the collar 38 to the spring retainer 26 to rotate the valve is dependent upon the type of connection existing between the spring ends and the collar 38 and the spring retainer 26. In other words, if the contacting surfaces of the spring 31 and the collar 38 and/or the spring retainer 26 are permitted to slide with respect to each other the valve 19 will not rotate as contemplated during each reciprocation cycle thereof. In prior valve assemblies respective opposite ends of the valve spring 31 merely frictionally engaged the collar 38 and the spring retainer 26 and thus the ability of the valve spring 31 to transmit torque without slipping from the collar 38 to the spring retainer 26 was dependent upon the frictional resistance force existing between the mating or contacting surfaces which, in turn, is dependent upon the force normal to the contacting surfaces exerted by the valve spring and the coefficient of static friction existing between the contacting surfaces. Because of the disposition of the valve assembly in overhead type engines the contacting surfaces are exposed to an atmosphere containing engine lubricating oil. Thus, in many instances because of the accumulation of engine lubricating oil on the contacting surfaces of the spring 31 and the spring retainer 26 and the collar 38 the co-efficient of static friction existing between the contacting surfaces is lowered to such an extent that the contacting surfaces were permitted to slide with respect to each other and therefore there was no assurance that the valves actually rotated as contemplated during each reciprocation cycle of the valves. In order to insure rotation of the valves during operation of the internal combustion engine to keep the valve seat and the valve stem free from carbon and other like deleterious substance the lower end of each valve spring 31 is positively coupled to the collar 38 whereby no lost rotary motion between the spring and collar is permitted. In a like manner the upper end of the coil spring 31 is non-rotatably connected to the spring retainer 26. Thus, any and all rotary motion of the collar 38 is transmitted directly to the spring 31 and such rotary motion is transmitted to the spring retainer 26 in a positive manner.

In order to lock the part 38 of the valve rotating device 34 against any rotary motion relatively to the spring 31 the lowermost coil of the spring 31 is provided with a pair of diametrically disposed flat portions 49 and the inner wall surface 47 of the dish-shaped element 42 has diametrically disposed portions 50 flattened to provide seating surfaces parallel to and engaging the flat portions 49 of the spring 31. With such a construction the dish-shaped element 42, which is non-rotatably secured to the element 38, is held against rotation relative to the spring 31 by reason of the positive connection between the spring and the skirt 46 of the dish-shaped member 42. The upper end of the spring 31 is similarly connected to the spring retainer 26 for rotation together. The uppermost coil of the spring 31 is provided with flat portions 51 which are adapted to abut flat portions 52 formed in the peripheral edge 29 and disposed at angles greater than 90° with respect to the plane containing the radially extending wall defining the bottom wall portion of the groove 30 to lock the upper end of the spring to the spring retainer 26 for rotation together. Thus it will be apparent a positive rotary drive connection is provided between the spring 31 and the retainer 26 and between the spring 31 and the dish-shaped element 42 and, as a result, rotary motion of the element 38 is transmitted to the valve stem 13 to rotate the same in a positive manner. The possibility of the valve spring rotating with respect to the retainer 26 and the dish-shaped element 42 is eliminated and the need for relying on the spring pressure and the coefficient of friction between the spring 31 and its mating parts to transmit such rotary motion to the valve stem is no longer necessary.

The embodiment of the invention chosen for the purposes of description and illustration herein is that preferred for achieving the objects of the invention and in developing the utility thereof in the most desirable manner, due regard being had to existing factors of economy, simplicity of design and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

I claim:

1. A valve structure comprising a valve and a valve stem, a valve spring retainer on one end of said stem, a valve rotating device encircling said stem including a stationary part and an adjacent rotatable part, said rotatable part being adapted to rotate with respect to said stationary part upon the application of a predetermined increase pressure forcing said parts axially toward each other, said valve spring retainer including a seating surface, said movable member carrying a seating surface, a coil valve spring encircling said stem having one end engaging said retainer seating surface and its opposite end engaging the seating surface carried by said movable member for biasing said valve in one direction, a flat formed on the coil of the spring which engages the seating surface of said retainer and a flat wall portion formed on the retainer seating surface engaging said flat for preventing relative rotation of said retainer relative to said spring, said flat wall portion extending axially and radially with respect to the longitudinal axis of said valve stem, a flat formed on the coil of the spring which engages the seating surface carried by said movable member and a flat wall section on the seating surface carried by said movable member engaging said flat for preventing relative rotation of said movable member with respect to said spring, said flat wall section on the seating surface carried by said movable member extending axially and radially with respect to the longitudinal axis of said valve stem, whereby said movable member spring and spring retainer are constrained for rotation together.

2. A valve structure comprising a valve and a valve stem, a valve spring retainer on one end of said stem, a valve rotating device including a stationary part and an adjacent rotatable part, said rotatable part being adapted to rotate with respect to said stationary part upon the application of a pre-determined increase pressure forcing said parts toward each other, a spring encircling said stem and operatively engaging said retainer and said movable part for biasing said valve in one direction, a flat formed on the coil of the spring which engages said retainer and a flat wall formed on the retainer extending axially and radially with respect to the longitudinal axis of said valve stem engaging said flat for preventing rotation of said retainer relative to said spring, a flat formed on the coil of the spring which operatively engages said movable part and a flat wall surface extending axially and radially with respect to the longitudinal axis of said valve stem carried by said movable part for engaging said flat on said end of said coil spring for preventing rotation of said movable member with respect to said spring.

3. A valve assembly comprising a valve having a valve stem, a valve spring retainer on one end of said stem, said valve spring retainer having a groove therein encircling said valve stem and radially spaced therefrom, said groove being partially defined by a radially extending wall and a wall extending axially with respect to said radially extending wall, a spring encircling said stem and engaging said walls defining said groove for biasing said valve in one direction, a flat formed on an outer surface portion of the coil of said spring which engages said axially extending wall partially defining said groove, said axially extending wall having a flat formed thereon and engaging said flat of said spring for preventing rotation of said retainer relative to said spring, a valve rotating device encircling said valve stem, means for operatively connecting said valve rotating device and the end of said spring opposite said valve retainer for positive rotation together.

4. A valve assembly substantially as set forth in claim 3, in which said means for operatively connecting said valve rotating device and said spring for positive rotation together includes a dish-shaped element non-rotatably fixed to said valve rotating device having a substantially radially extending wall and an annular skirt defining the outer marginal edge of said radially extending wall and extending axially with respect thereto adapted to receive one end of said valve spring, said skirt having a pair of diametrically spaced, flat wall portions and said spring end having a pair of diametrically spaced, flat portions formed thereon abutting said flat wall portions of said skirt.

5. A valve assembly comprising an engine wall having a valve seat, a poppet valve having a stem slidably and rotatably mounted in said engine wall for movement between open and closed positions and a head coacting with said seat when said valve is in said closed position; a valve spring operatively engaging said valve stem for biasing said valve head toward said valve seat; a valve rotating device interposed between said valve spring and said engine wall, said device including a stationary part and a movable part, said movable part being adapted to rotate with respect to said stationary part upon the application of increased spring pressure forcing said parts axially toward each other when said valve moves to its open position; means for positively locking said spring and said valve stem against relative rotation; and means for positively locking said movable part and said spring against relative rotation.

6. In a combination substantially as set forth in claim 5, in which said last-mentioned means includes a dish-shaped element non-rotatably fixed to said movable part having a radially extending wall and an axially extending skirt defining the outer marginal edge of said radially extending wall, said radially extending wall and skirt forming a seat for one end of said valve spring, said skirt having a pair of diametrically spaced, flat wall portions and said spring end having a pair of diametrically spaced, flat portions formed thereon adapted to abut said flat portions of said skirt.

7. An internal combustion engine valve assembly comprising a valve movable between open and closed positions, said valve having a valve stem; a valve retainer non-rotatably secured to one end of said stem; a valve rotating device encircling said valve stem including a stationary part and an adjacent rotatable part, said rotatable part being adapted to rotate with respect to said stationary part upon the application of a predetermined increase pressure forcing said parts axially toward each other; a valve spring encircling said stem and operatively engaging said retainer and said rotatable part for biasing said valve to its closed position, said rotatable part being relatively rotated when said valve moves to its open position; means for connecting said movable part and said spring for positive rotation together; and means for connecting said spring and said retainer for positive rotation together.

8. A valve assembly substantially as set forth in claim 7 in which said first-mentioned means includes a dish-shaped element including an axial extending annular wall non-rotatably secured to said movable part, said annular wall element having a pair of spaced flat wall portions and one end of said spring having spaced flat surfaces adapted to abut against said flat wall surfaces of said annular wall.

9. A valve assembly comprising a valve movable between open and closed positions; a valve spring operatively connected to said valve biasing said valve to its closed position; a valve rotating device including a movable part operatively engaged by said spring, said movable part being rotatable upon the application of increased force thereto when said valve is moved to its open position; means for positively coupling said spring and said movable member for rotation together; and means for positively coupling said spring and valve for rotation together.

10. A valve assembly substantially as set forth in claim 9 in which said last-mentioned means includes a spring retainer non-rotatably fixed to said valve, said spring retainer being provided with a groove for receiving one end of said valve spring, one side wall defining said groove having a plurality of portions thereof disposed in inclined flat planes with respect to the bottom wall of said groove and said spring end received in said groove having a plurality of flattened portions formed on the outer surface thereof adapted to abut said flat wall surfaces of said groove defining side wall.

11. A valve assembly at set forth in claim 9 in which said valve spring is of the coil type and encircles said stem, the outer surface of each end coil of the spring having a flat formed thereon; said means for positively locking said spring and said valve stem against relative rotation including a valve spring retainer non-rotatably secured to the free end of said stem, said spring retainer including a wall portion extending radially from said valve stem and a skirt depending axially from said radially extending wall portion, one end of said coil spring adapted to abut said skirt and said radially extending wall adjacent the juncture of said wall and skirt for biasing said valve head toward said valve seat, one section of said skirt being flat and disposed at an angle greater than 90° with respect to the plane of said radially extending wall for engaging the flat and the outer surface of said end coil of said spring.

References Cited in the file of this patent

UNITED STATES PATENTS

| | | |
|---|---|---|
| 2,582,060 | Newton | Jan. 8, 1952 |
| 2,686,508 | Ralston | Aug. 17, 1954 |